April 3, 1951  A. F. POLK ET AL  2,547,717
GAUGING DEVICE

Filed July 12, 1944  2 Sheets-Sheet 1

INVENTORS
Albert F. Polk and
Jesse H. Straw
BY
Edward T. Noel
ATTORNEY.

April 3, 1951     A. F. POLK ET AL     2,547,717
GAUGING DEVICE

Filed July 12, 1944     2 Sheets-Sheet 2

INVENTORS
Albert F. Polk and
Jesse H. Straw
BY Edward J. Noe
ATTORNEY.

Patented Apr. 3, 1951

2,547,717

UNITED STATES PATENT OFFICE 2,547,717

GAUGING DEVICE

Albert F. Polk and Jesse H. Straw, Dayton, Ohio, assignors to The Sheffield Corporation, Dayton, Ohio, a corporation of Ohio Application July 12, 1944, Serial No. 544,516

11 Claims. (Cl. 33—174)

This invention relates to gauging devices.

One object of the invention is the provision of a gauging device for measuring or gauging the thickness of a wall of an annular workpiece at various points around the wall.

Another object is the provision of a gauging device having provision for rotating a hollow workpiece, and continuously gauging the thickness of the wall, as the workpiece is rotated.

Another object is the provision of a gauging device having a work holder by means of which a traversing movement can be given to the workpiece, and gauging means including a movable gauging bar along which the workpiece rolls, to provide a continuous measurement of the wall thickness.

Other objects and advantages of the invention will be apparent from the following description, the appended claims, and the accompanying drawing, in which:

Figure 1:
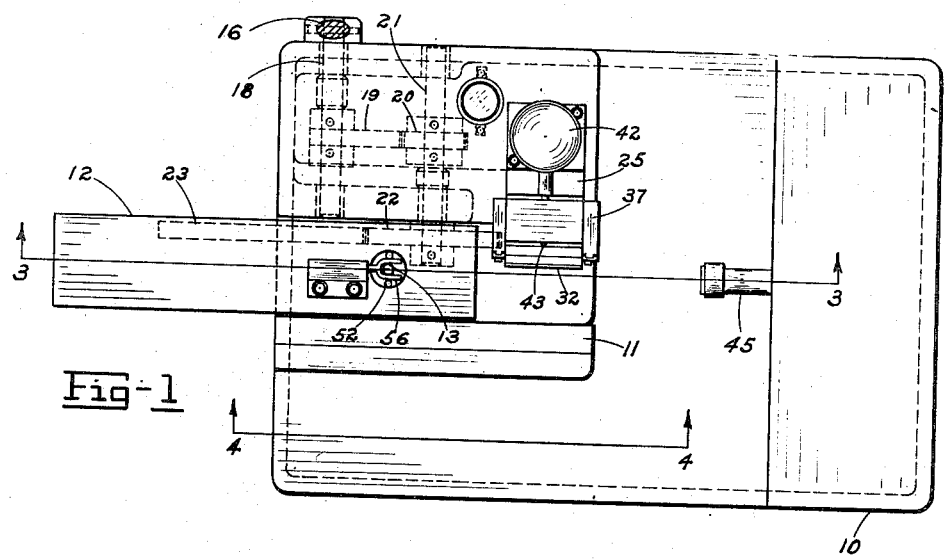
Fig. 1 is a top plan view of a gauging device embodying the present invention.

Referring more particularly to the drawing, in which a preferred embodiment of the invention has been illustrated in connection with gauging indicators for measuring diameters and lengths of a hollow workpiece such as a shell body, 10 generally designates a base, having guide ways 11 which support a reciprocally operated work holder 12. The work holder carries suitable means for locating a hollow workpiece, such means, as herein shown, comprising a vertical stem 13 the diameter of which is very slightly less than the inside diameter of the workpiece 14, shown in Fig. 5. It will be understood that the gauging device may be adapted for measuring the wall thickness of workpieces of various forms and shapes other than that which has been chosen for purposes of illustration.

The work holder when in the work loading position is displaced from both of its limiting positions. In one limiting position it projects out from the base, as shown in Fig. 1, and the stem 13 is below the covering portion of a chute into which the workpieces are ejected. In the work loading position the work is displaced from the ejection chute and the operator can readily apply the workpiece to the stem 13 so that its lower end rests on a boss or shoulder 15. By operating a handle 16, the operator can then move the work holder towards the right as viewed in Figs. 1 and 4 to bring the work into gauging position. Movement of the lever 16 rotates the shaft 18 having a gear segment 19 which meshes with gear pinion 20. The latter is fixed on a shaft 21 which carries a spur gear 22 meshing with a rack 23 that is fixed on the lower side of the work holder 12.

Figure 4:
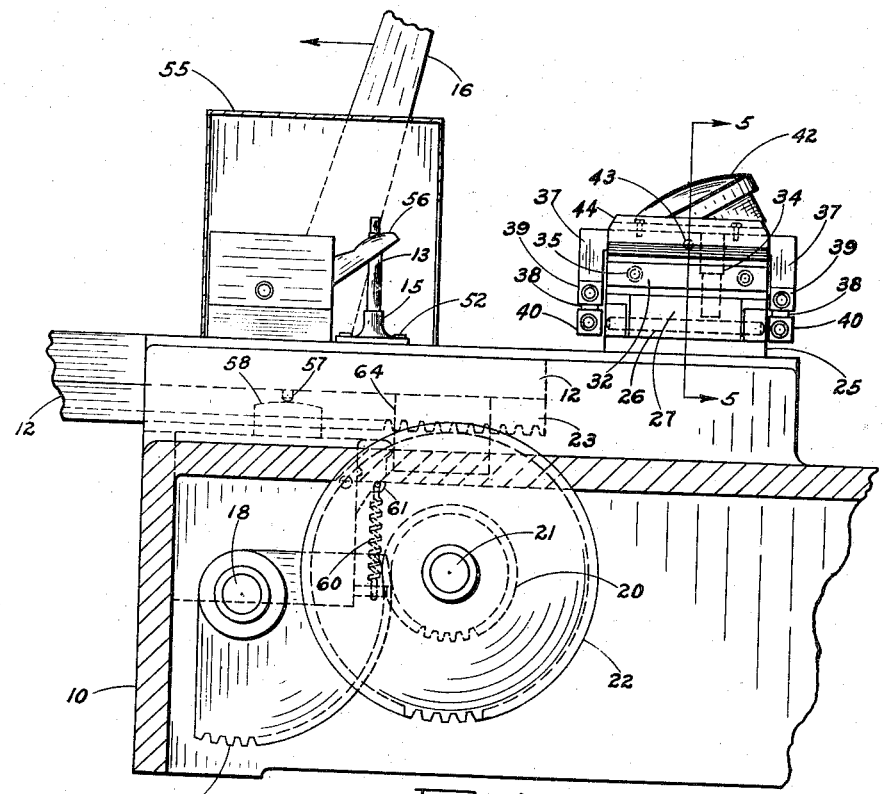
Fig. 4 is a vertical section on the line 4—4 of Fig. 1.
Figure 5:
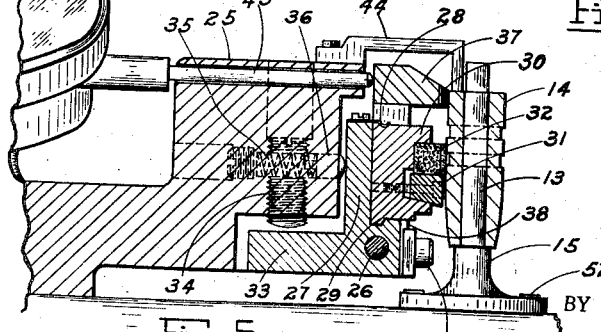
Fig. 5 is a vertical section on the line 5—5 of Fig. 4, but with the work holder moved into operative position.

During the movement of the work holder from the loading position the workpiece is carried past a gauging means and a work rotating means, the latter yieldingly engaging the work so that the workpiece rolls in contact with an operable part of the gauging means, providing a continuous indication of the wall thickness and showing any variations in that measurement. For this purpose the base 10, as shown in Figs. 4 and 5, is provided with a bracket 25 rotatably supporting the ends of a pivot pin 26 carrying an arm 27 of considerable width. This arm is provided with a spring clip 28 and a groove 29 so as to detachably receive and hold a supporting strip 30 extending parallel to the direction of movement of the work holder, and a removable clamp strip 31 holds a work rotating bar 32 on strip 30. The bar 32 has a friction surface of suitable roughness so that when it is in yielding contact with the workpiece, it will cause the latter to rotate as it is moved along in a path parallel to the bar length. Fixed on the arm 27 is a lateral extension 33 engageable with a set screw 34 that is adjustably threaded in the bracket 25 to limit the extent of clockwise movement of the work engaging bar. Arranged in the bracket 25 is a spring 35 pressing a pin 36 against the arm 27 so as to maintain a yielding contact between the work rotating bar 32 and the workpiece during the travel of the workpiece.

As the workpiece is rotated by the bar 32, it rolls along a gauging bar 37 which is supported for yielding movement towards and from the workpiece, preferably by means of flexible spring blades 38 the upper ends of which are held by clamp blocks 39 to the bar 37 while their lower ends are held by clamp blocks 40 on the bracket 25. These spring blades 38 normally hold the bar 37 towards the right from the position shown in Fig. 5 so that when the workpiece is brought into engagement with the bar 37 the latter is moved back, and as the work rolls in contact with the bar 37 any variations in the wall thickness of the workpiece will cause the bar 37 to move in a direction perpendicular to its length. The position of the bar 37 is shown by a suitable indicator 42 having a gauging plunger 43 extending through a passage in the bracket 25, the outer end of this plunger being in contact with the rear face of the gauging bar 37. The indicator 42 is mounted directly on the bracket 25. As will be noted, the work rotating bar 32 engages the surface of the workpiece where the diameter is about the same as that being gauged by the bar 37 so that substantial rubbing of the workpiece with respect to the bar 37 does not take place.

As the workpiece rolls along the gauging bar 37 it is held down by a retaining arm 44 fixed on the bracket 25, preventing the possibility of the work riding upwardly along the stem 13 as it moves. The arm 44 also serves to prevent injury to the gauging fingers with which the workpiece may subsequently be brought into contact, if the workpiece is of excessive length, as it will serve as a stop preventing continued movement of the work holder under such conditions.

Figure 2:
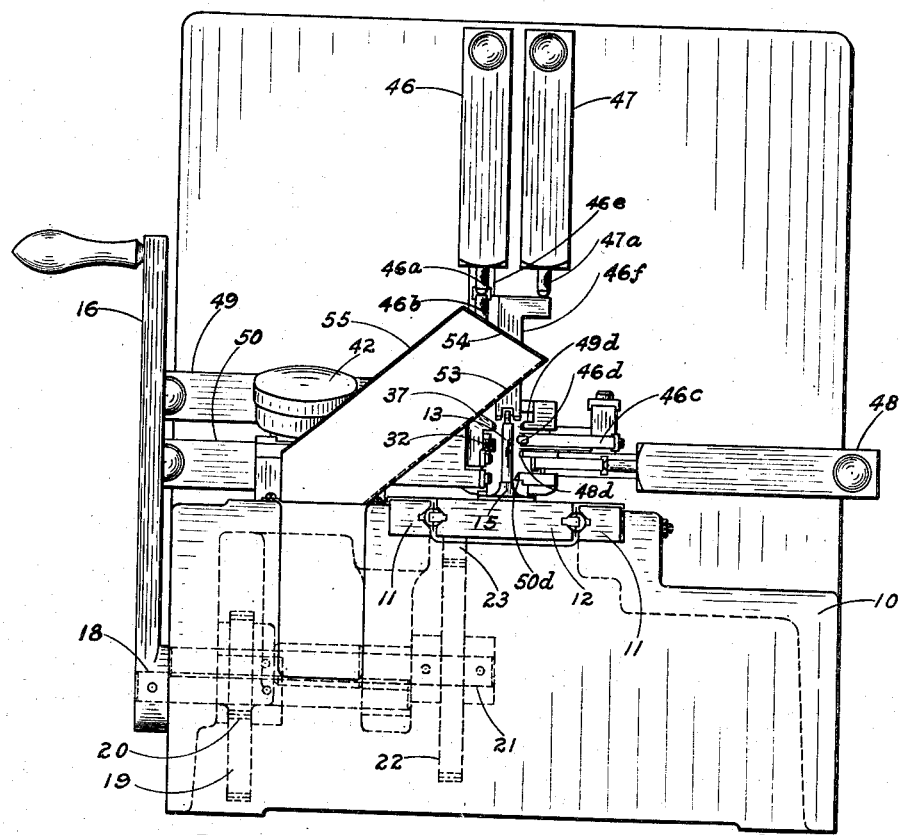
Fig. 2 is a front elevation of the gauging device.
Figure 3:
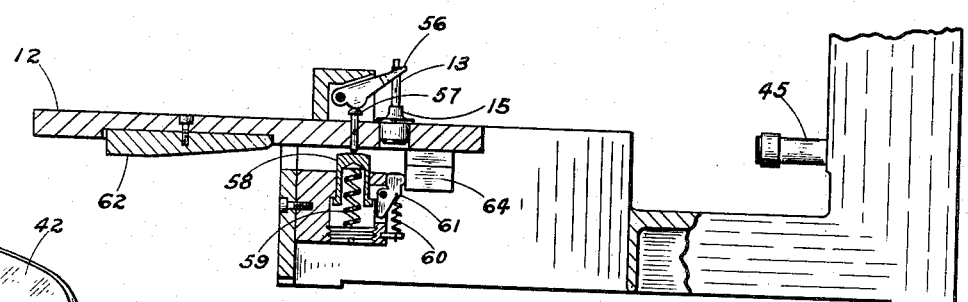
Fig. 3 is a vertical section on the line 3—3 of Fig. 1.

After the workpiece has been moved past the gauging bar 37, other measurements of the workpiece may be obtained by moving the latter farther and into a position determined by a stop 45 which engages the end of the work holder 12. In this position, the workpiece is brought into comparative relation with a series of gauging means that operate gauges or indicators 46, 47, 48, 49 and 50. The gauge 46 has a gauging plunger 46a operated by a bar 46b which is controlled by up and down movements of a gauging member 46c. The latter is yieldingly supported for up and down movements and is provided with two opposed work gauging fingers one of which is indicated at 46d and these engage one of the grooves of the workpiece so that the gauging plunger 46a will be moved vertically in accordance with the vertical positioning of the gauging member 46c. The gauge 46 itself is fixed on a vertically movable bar 46e to which the gauge plate 46f is secured. The latter is provided with two fingers that straddle the upper end of the work holding stem 13 and contact with the upper end of the workpiece. The plate 46f operates the plunger 47a of the gauge 47 to measure the total height of the workpiece. Gauging fingers 49d control the gauge 49 and measure the diameter at the upper end of the workpiece. Additional gauging fingers 48d control gauge 48 and show the diameter of the workpiece below its bottom groove. In like manner, the gauge 50 is provided with gauging fingers 50d for measuring the diameter at the lower end of the workpiece, these gauging fingers being carried by a gauging member that extends down and contacts with locating bosses 52 on the work holder, the upper ends of these bosses being a fixed predetermined distance below the upper surface of the shoulder 15 on which the work rests. It will be understood that the particular gauging devices that may be provided for gauging the various diameters and/or lengths of the workpiece may be varied to suit particular conditions, and that any suitable gauging device may be provided for this purpose. They may be constructed as disclosed in Patent 2,254,812, granted September 2, 1941. The several gauging devices have been generally illustrated in Fig. 2, but have been omitted in Figs. 1 and 3.

When the work holder is retracted, by operating the handle 16, the workpiece is kicked off of the stem 13 by an ejector arm 56 which throws the workpiece up through an opening 53 of the ejector chute 55 and into contact with an inclined cover wall 54 of the chute. This chute is carried by the base 10 adjacent the work location when the work holder is fully retracted, and carries workpieces thrown into it down to a suitable point of discharge. The ejector arm 56 is bifurcated and straddles the stem 13. When the workpiece is applied the stem 13 is some distance from its left hand limiting position illustrated in Figs. 3 and 4, and the ejector bar 56 is depressed. The ejector bar is engaged by a pin 57 operated by a spring pressed piston 58 having a spring 59 beneath it. The lower end of the piston is outwardly flanged, and a spring 60 serves to yieldingly urge a detent 61 clockwise when the piston 58 is lowered, to yieldingly latch the piston in its inoperative position. The piston 58 is moved down by a cam plate 62 on the work holder 12 after the work holder has moved a short distance from the work ejecting position. Thus the work can be applied to the stem 13, carried past the gauging bar 37 while the operator views the indicator 42, and then moved into an advanced limiting position in which additional gauging operations are obtained. As the work is retracted it will be brought out past the gauging bar 37 and can be picked off of the stem before it reaches the ejecting position if it has failed to meet any of the required tests. If it has met the required tests, the work holder is fully retracted and this brings the work piece to a position just below the opening in the ejection chute 55. As it reaches that position, the detent 61 is swung counterclockwise by a lug 64 on the work holder to release the spring pressed piston 58 which kicks the arm 56 and thus eject the work.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a non-rotatable work holder adapted to enter the opening in a hollow workpiece and on which a hollow workpiece may rotate, a work rotating elongated part at one side of said holder and yieldingly engaging an external surface of the workpiece in tangential relation therewith, a support on which said work rotating part and work holder are arranged, means for relatively moving the workpiece and the work rotating part in a direction parallel to the length of the part to rotate the workpiece on the holder, a gauging member for yieldingly engaging an external surface of the workpiece during its rotation and arranged so that its yielding action on the workpiece is in the same direction as the yielding action of the work rotating part, and gauging means controlled by said gauging member during the rotation of the workpiece.

2. Gauging apparatus comprising a work holding stem adapted to enter the opening in a hollow workpiece and on which a hollow workpiece may rotate and only slightly smaller than the hole in the workpiece, a work rotating elongated part at one side of said stem and yieldingly engaging an external surface of the workpiece to apply a force on the workpiece in a plane radially of said stem, a support on which said work rotating part and stem are arranged, means for moving said support in the direction of the length of said part to rotate the workpiece on the stem, a gauging member engaging an external surface of the workpiece during its rotation and acting on the workpiece at a point adjacent the work rotating part so that it gauges wall thickness, said gauging member being movable radially of said stem, and gauging means controlled by said gauging member during the rotation of the workpiece.

3. Gauging apparatus comprising a work holder stem adapted to enter the opening in a hollow workpiece and on which a hollow workpiece may rotate, an elongated work rotating part at one side of the stem for yieldingly engaging an external surface of the workpiece, means for relatively moving the stem and said part in the direction of the length of said part to rotate the workpiece on the stem, a movable gauging bar having a flat work engaging surface parallel to said part and tangent to the external surface of the workpiece, said gauging bar being arranged on the same side of the stem as the work rotating part, and gauging means controlled by said gauging bar during rotation of the workpiece.

4. Gauging apparatus comprising a work holder having provision for rotatably supporting a workpiece generally coaxially therewith, an elongated work rotating part at one side of the work engaging an external surface of the workpiece, means for relatively guiding said work holder and said part for movement in the direction of the length of said part to rotate the workpiece on the work holder, a movable gauging bar having a flat work engaging surface parallel to said part and tangent to the surface of the workpiece for gauging a dimension of the workpiece during its movement along said part, said gauging bar being arranged on the same side of the work holder as said work rotating part, and gauging means controlled by said gauging bar during rotation of the workpiece.

5. Gauging apparatus comprising a non-rotatable work holder stem adapted for engagement within the opening of a hollow workpiece and on which a hollow workpiece may rotate, a work rotating bar at one side of the stem for engaging an external surface of the workpiece, means for yieldingly urging said bar towards the workpiece, means for relatively moving the stem and said bar in the direction of the length of said bar to rotate the workpiece on the stem, a movable gauging bar having a flat work engaging surface parallel to said bar and tangent to the surface of the workpiece, said gauging bar engaging the workpiece in the same direction as the engaging action of the work rotating bar, and size gauging means controlled by said gauging bar during rotation of the workpiece.

6. Gauging apparatus comprising a base, a work holder reciprocally operable on said base for movement from a loading position to a gauging position, locating means on said work holder adapted for engagement within the opening of a hollow workpiece and for rotatably supporting the workpiece, a work rotating part carried by said base at one side of the locating means for yieldingly engaging an external surface of the workpiece to rotate the workpiece on the locating means, a gauging member having a flat work engaging surface tangent to the outer surface of the workpiece and parallel to the direction of movement of said workholder, means for yieldingly supporting said gauging member on said base at the same side of the locating means as said work rotating part for movement towards and from the work position, and gauging means controlled by said gauging member.

7. Gauging apparatus comprising a base, a work holder reciprocally operable on said base for movement from a loading position to a gauging position, a non-rotatable stem on said work holder adapted for engagement within the opening of a hollow workpiece and for rotatably supporting the hollow workpiece, a work rotating bar carried by said base at one side of the stem for yieldingly engaging an external surface of the workpiece to rotate the workpiece on the stem and hold the workpiece against one side of the stem, a gauging bar having a flat work engaging surface parallel to the direction of movement of said work holder and adapted for maintained contact with the workpiece as the workpiece moves along the gauging bar, means for yieldingly supporting said gauging bar on said base for movement towards and from the work position, and gauging means controlled by said gauging bar.

8. Gauging apparatus comprising a base, a work holder reciprocally operable on said base, a stem on said work holder for rotatably supporting a hollow workpiece substantially coaxially therewith, a work rotating bar carried by said base at one side of the stem and extending parallel to the direction of movement of said holder for yieldingly engaging an external surface of the workpiece to rotate the workpiece on the stem while holding the workpiece against one side of the stem, a gauging bar parallel to the direction of movement of said work holder, means for yieldingly supporting said gauging bar on said base for movement towards and from the work position, size gauging means controlled by said gauging bar.

9. Gauging apparatus comprising a work holder having a stem adapted for engagement within the opening of a hollow annular workpiece and on which the workpiece may rotate, a work rotating part at one side of said stem, means for yieldingly holding said part in engagement with the workpiece, a support on which said work rotating part and stem are arranged, means for relatively moving the workpiece and the work rotating part to rotate the workpiece on the stem with the workpiece in continuous engagement with one side of the stem, a gauging member located at the same side of the stem as said work rotating part and yieldingly engaging a peripheral surface of the workpiece during the rotation of the workpiece, and gauging means controlled by said gauging member during the rotation of the workpiece.

10. Gauging apparatus comprising a base, a work holding stem adapted for engagement within the opening of a hollow annular workpiece, means for moving said stem in a rectilinear path through a work gauging zone, an elongated member having a work engaging surface extending parallel to the direction of movement of the stem and along which the workpiece is rolled during travel of the workpiece through the gauging zone, means for yieldingly holding said elongated member engaged with the workpiece, and means operating from the same side of the workpiece as said elongated member for continuously gauging a radial measurement of the workpiece during rotation and rectilinear movements of the workpiece.

11. Gauging apparatus comprising a base, a work holder movable through a work loading position and through a work gauging zone and adapted to rotatably support a hollow workpiece, means operable to bodily move the work holder on said base, means extending along one side of the workpiece in tangential contact therewith for rotating a hollow workpiece on said work holder as the workpiece is moved along the work gauging zone, a gauging instrument, and means engaging a surface of the workpiece and operably associated with said gauging instrument for continuously gauging the wall thickness of the workpiece during its rotation and bodily movement through the gauging zone, said gauging means operating from the same side of the workpiece as said rotating means.

ALBERT F. POLK.
JESSE H. STRAW.

REFERENCES CITED

The following references are of record in the file of this patent:

UNITED STATES PATENTS

| Number | Name | Date |
| --- | --- | --- |
| 1,432,212 | Schlaupitz | Oct. 17, 1922 |
| 1,491,613 | Miller | Apr. 22, 1924 |
| 1,967,296 | Dixon | July 24, 1934 |
| 2,030,237 | Brittain | Feb. 11, 1936 |
| 2,318,970 | Richmond | May 11, 1943 |
| 2,352,507 | Aller | June 27, 1944 |
| 2,353,813 | Deeren | July 18, 1944 |
| 2,369,477 | Martin | Feb. 13, 1945 |